United States Patent [19]

Campioni

[11] 4,095,256
[45] June 13, 1978

[54] DIFFERENTIAL GAIN ERROR CORRECTION IN COLOR TELEVISION SYSTEMS

[75] Inventor: Armando Campioni, Turin, Italy

[73] Assignee: Indesit Industria Elettrodomestici Italiana S.p.A., Rivalta (Turin), Italy

[21] Appl. No.: 699,298

[22] Filed: Jun. 23, 1976

[30] Foreign Application Priority Data

Jul. 1, 1975 Italy ............................... 68681 A/75

[51] Int. Cl.² ........................................... H04N 9/535
[52] U.S. Cl. ......................................... 358/35; 358/27
[58] Field of Search ....................... 358/27, 28, 10, 35, 358/16, 19

[56] References Cited

U.S. PATENT DOCUMENTS

| | | | |
|---|---|---|---|
| 3,368,029 | 2/1968 | Macdiarmid | 358/35 |
| 3,673,320 | 6/1972 | Carnt et al. | 358/28 |
| 3,679,816 | 7/1972 | Avins et al. | 358/27 |

OTHER PUBLICATIONS

Hutson, *Color Television Theory*, McGraw-Hill, 1971, pp. 46-63.
Macdiamid et al., "Correcting Color Signal Distortion", *Electronics World*, Feb. 1966, p. 66.

*Primary Examiner*—John C. Martin
*Attorney, Agent, or Firm*—Sughrue, Rothwell, Mion, Zinn and Macpeak

[57] ABSTRACT

In a color television system a first periodic signal having subcarrier frequency is inserted into an amplitude-modulated carrier during line blanking interval with constant amplitude and there is inserted periodically into the first signal, at least once in every field scan, a second signal having a different mean amplitude from the first and a constant amplitude, an amplitude comparison between the first and second signals being utilized in the receiver to correct differential gain distortion.

5 Claims, 3 Drawing Figures

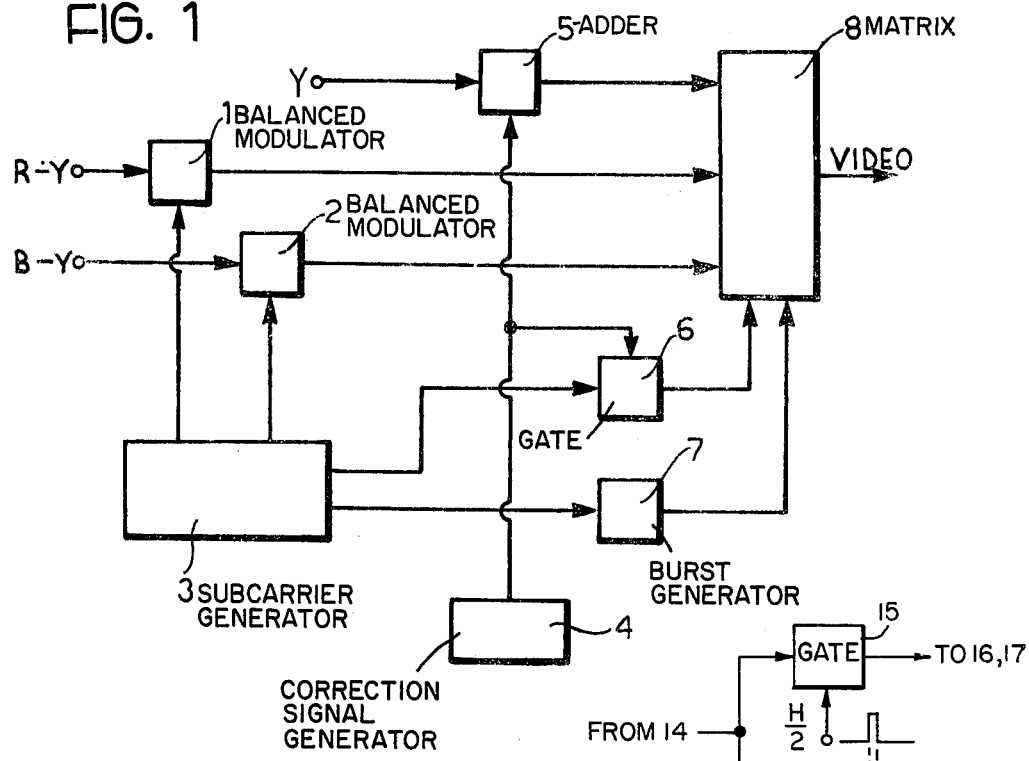
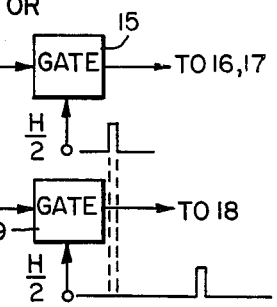
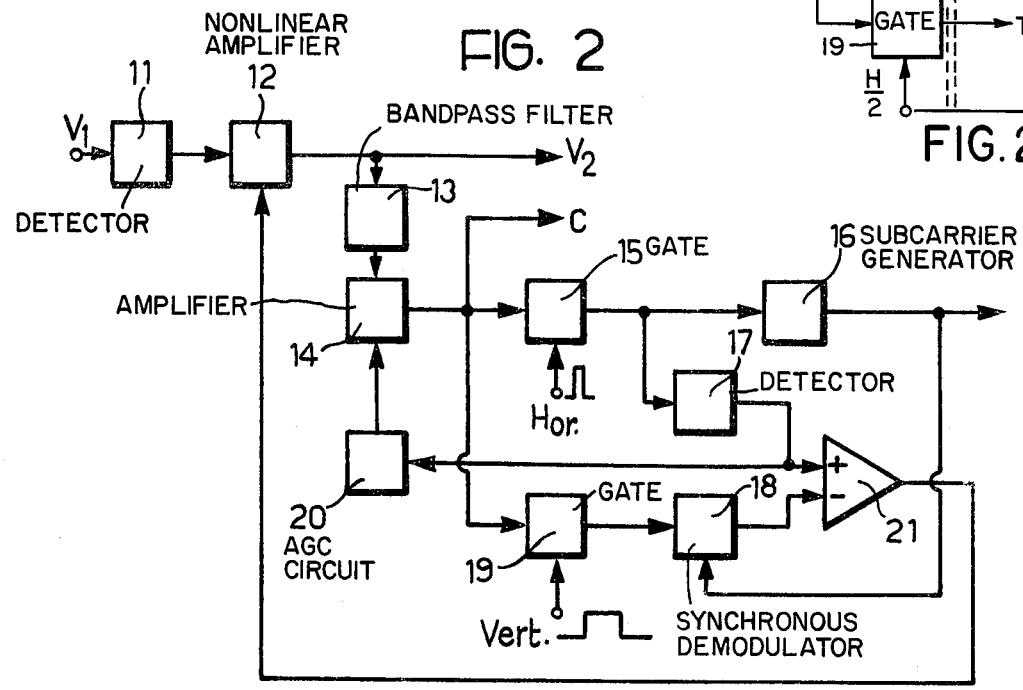

DIFFERENTIAL GAIN ERROR CORRECTION IN COLOR TELEVISION SYSTEMS

BACKGROUND OF THE INVENTION

The present invention relates to a color television system in which at least one image signal is transmitted by means of amplitude modulation of a carrier.

There are many color television systems in which amplitude modulation is used for one or more image signals:

the Y signal and two color difference signals in the NTSC, PAL, NIIR, ISA systems;

the Y signal in the SECAM system.

It is known that during the transmission/receiving process, differential gain distortion may easily occur, or distortion may arise through the original signal becoming to some extent compressed and expanded. For example, such distortions are typical when using a radio link between a transmitter and receiver: when transmitting over a long distance distortion errors of up to 50% and beyond are not uncommon. Such distortions produce alterations in the resultant image at the receiver, which no longer reproduces faithfully the image at the transmitter in that the luminance level and, in the NTSC, PAL, etc. systems, the saturation values also, become different from the original values.

As is known, the PAL system is self-compensatory with regard to phase errors, which it transforms into saturation errors according to the cosine of the phase angle. Various complicated decoders have been proposed to correct this residual saturation error, which is at maximum of the order of 10–15%, (see for example U.K. Pat. No. 1,307,566). The differential gain error, on the other hand, for example on yellow, may be four times greater.

The object of the present invention is to remedy this state of affairs, providing a simple method of compensating for differential gain error.

SUMMARY OF THE INVENTION

According to the present invention there is provided a color television system, in which at least one image signal is transmitted by means of amplitude modulation of a carrier and in which a first periodic signal having the frequency of a subcarrier is inserted with constant amplitude into the transmitted signal during the line blanking interval with constant amplitude, characterised in that there is inserted periodically into the signal, at least once every field scan, a second signal having a different mean amplitude from the first and a constant amplitude and in that the amplitude of said second signal is utilised in a receiver, by comparison of the amplitude of the second signal with that of the first signal, to correct differential gain distortion.

BRIEF DESCRIPTION OF THE DRAWINGS

The invention will now be further described, by way of non-limiting example, with reference to the accompanying drawings, in which:

FIG. 1 represents part of an encoder (PAL or NTSC) adapted to generate a signal in a system according to the invention, and FIG. 2 shows a decoder circuit of a receiver for exploiting the advantages of the system according to the invention, and FIG. 2a shows a modification in the operation of the decoder circuit of FIG. 2.

DETAILED DESCRIPTION OF THE ILLUSTRATED EMBODIMENT

Referring to FIG. 1, the color difference signals R-Y and B-Y amplitude-modulate by means of balanced modulators 1 and 2 respectively first and second signals having sub-carrier frequency which are in phase-quadrature with respect to each other and which are both provided by a sub-carrier generator 3. The outputs of the modulators 1 and 2 are passed to a matrix 8 which also receives the Y signal through an adder 5, reference signals (burst) and correction signals being supplied to the matrix 8 by the sub-carrier generator 3 through a burst generator 7 and a gate 6 respectively.

A correction signal generator 4 provides for example a signal at field repetition frequency which modifies the amplitude level of the Y signal by means of the adder 5 and which opens the gate 6, in such a way that the output of the matrix 8 is available during the interval of field blanking, and for the active duration of a line a signal is transmitted corresponding to the color yellow (with 75% saturation) of the "color bar" test signal. As is known, such signal has a peak-to-peak amplitude of 0.33 at the subcarrier frequency and, being situated at a luminance level of 0.67, reaches a theoretical depth of modulation of unity, or 100%.

In the receiver as shown in FIG. 2, a video signal $V_1$ is detected in a detector 11 and applied to an amplifier 12 having a variable non-linear characteristic, at the output of which a modified video signal $V_2$ appears, which is also passed through a band pass filter 13 to a controlled amplifier 14 which provides the chrominance signal C. The burst separated in the appropriate gate 15 passes to a sub-carrier regenerator 16 and to an amplitude detector 17 which supplies automatic gain control signals to the controlled amplifier 14 through the circuit 20 and a comparison signal to one input of a differential amplifier 21, which receives on its other input the correction signal separated in a gate 19 and demodulated in a synchronous demodulator 18. The synchronous demodulator 18 is driven by the sub-carrier regenerator 16. The output of the differential amplifier 21, proportional to variations of the correction signal with respect to the burst, is utilised to vary in one sense or another as appropriate the characteristic of the amplifier 12 situated in the video (luminance plus chrominance) signal path.

In this way an automatic compensation of the differential gain error is effected with consequent considerable improvement in the quality of the image.

Many variations are naturally possible in the system described: for example it is possible to obtain the information already demodulated corresponding to the "yellow line" and that corresponding to the "burst" at the output of the B-Y synchronous demodulator, taking into account the fact that the amplitude of the yellow signal reduces to 3% in this case, because only the B-Y component is taken from it. Alternatively, it is possible to avoid amplitude comparison by taking the "yellow line" information after the chrominance amplifier, the gain of which is controlled automatically as a function of the amplitude of "burst." In the latter case the amplitude of the "yellow" signal already furnishes the desired information, which is utilised to control the characteristic of the video amplifier. It is alternatively possible to insert the yellow signal during the line flyback instead of the field return, for example by alternating the yellow signal with the "burst" in alternately suppressed burst (ISA) systems. In this case the yellow signal may be isolated by means of gate 19 operating at half line frequency as shown in FIG. 2a; the frequency of the yellow signal may in such case be displaced in relation to that of the "burst" to enable its separation.

A last possibility is that of placing the same "burst" (in PAL systems, for example) in alternate lines at black level (PAL lines) and at, say, yellow level (0.89; NTSC lines). In this way information proportional to the differential gain error may be obtained by means of envelope detection of the burst and filtering of the component at half line frequency.

It is interesting to note that in this variant, the phase errors resulting from differential gain errors are also compensated automatically insofar as the mean phase of the "burst" is influenced by the differential gain errors.

What is claimed is:

1. A color television system, comprising a transmitter means for transmitting an amplitude-modulated carrier, and including means for inserting into the transmitted signal during the line blanking interval a color synchronizing burst signal with constant amplitude having the frequency of a subcarrier, means for inserting periodically into the said transmitted signal, at least once in every field scan, a second signal having a different mean amplitude and a different phase from the burst signal and a constant amplitude, and receiver means including means for comparing the amplitude of the second signal with that of the burst signal to correct differential gain distortion.

2. The system defined in claim 1, wherein said burst signal is inserted every second line and said second signal is inserted during the line blanking interval in which the burst signal is not present.

3. The system defined in claim 1, specifically a PAL system, wherein said second signal is a yellow signal with amplitude sufficient to reach theoretical 100% modulation of the video carrier.

4. The system defined in claim 1, wherein the receiver means includes means for utilizing the information obtained from comparison of the amplitudes of said burst and said second signals to return the ratio of said amplitudes automatically to their original values.

5. The system defined in claim 4, wherein said second signal utilizing means control a characteristic of a video signal amplifier of the receiver means.

* * * * *